J. W. MOON.
DISPLAY RACK.
APPLICATION FILED AUG. 18, 1908.
925,011.
Patented June 15, 1909.
5 SHEETS—SHEET 1.
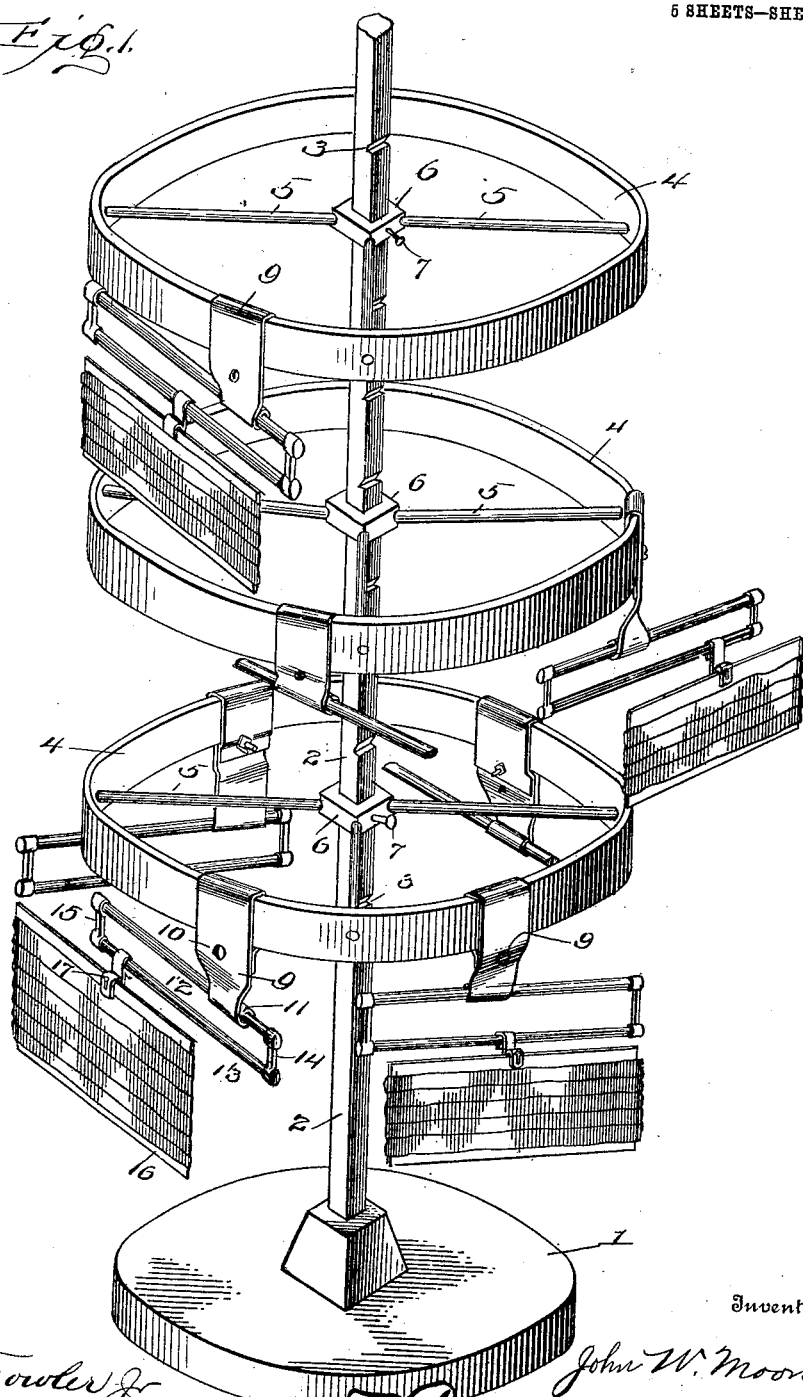

J. W. MOON.
DISPLAY RACK.
APPLICATION FILED AUG. 18, 1908.
925,011.
Patented June 15, 1909.
5 SHEETS—SHEET 2.
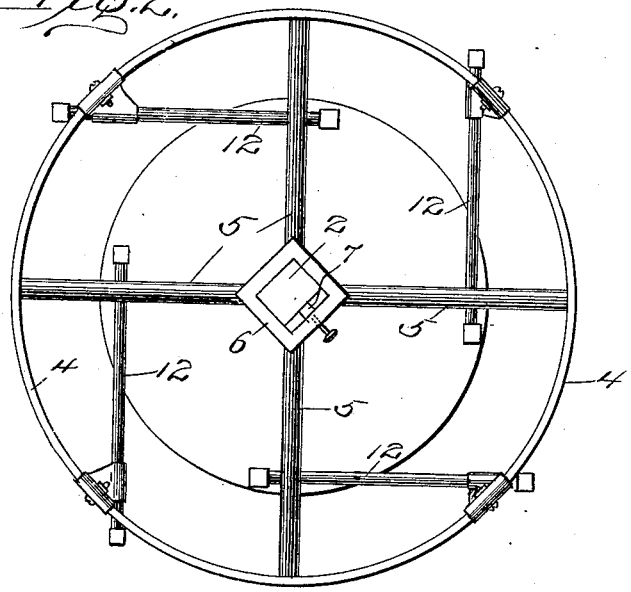
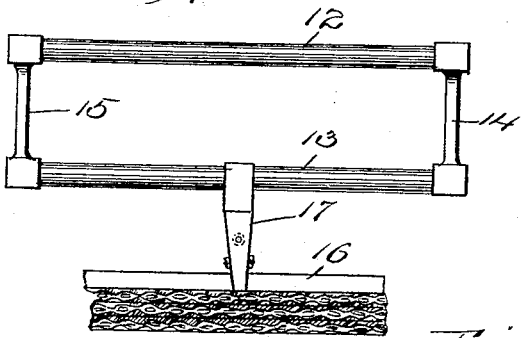
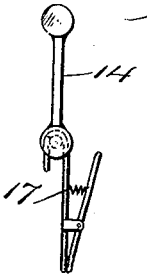
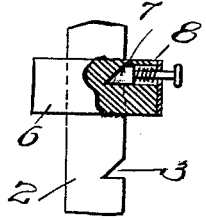
Witnesses
J. M. Fowler Jr.
A. J. Kitchin
Inventor
John W. Moon
By Mason Fenwick Lawrence
his Attorneys J. W. MOON.
DISPLAY RACK.
APPLICATION FILED AUG. 18, 1908.
925,011.
Patented June 15, 1909.
5 SHEETS—SHEET 3.
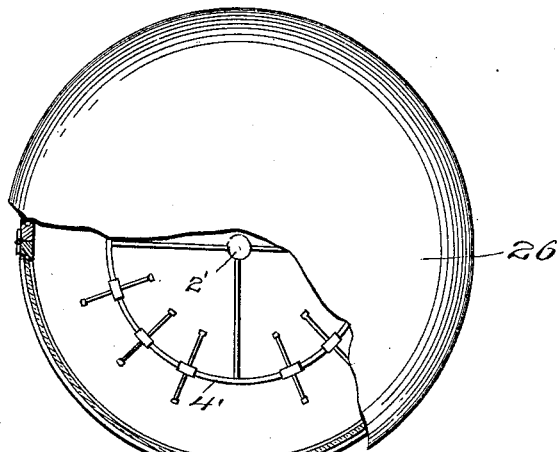
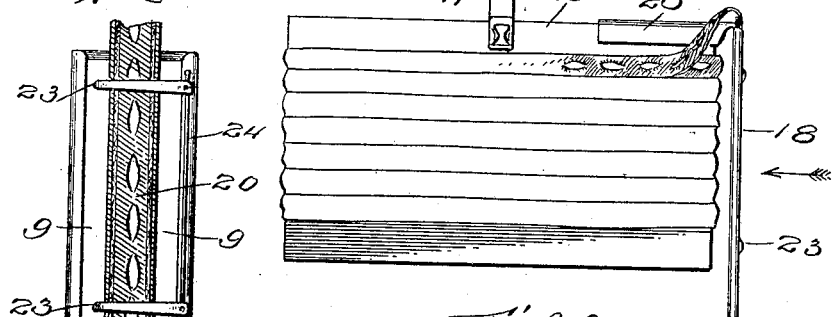
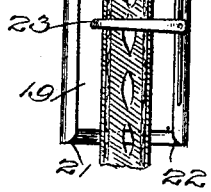
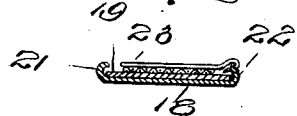
Witnesses
J. M. Fowler Jr.
A. S. Kitchin.
Inventor
John W. Moon
By Mason Fenwick & Lawrence
his Attorneys J. W. MOON.
DISPLAY RACK.
APPLICATION FILED AUG. 18, 1908.
925,011.
Patented June 15, 1909.
5 SHEETS—SHEET 4.
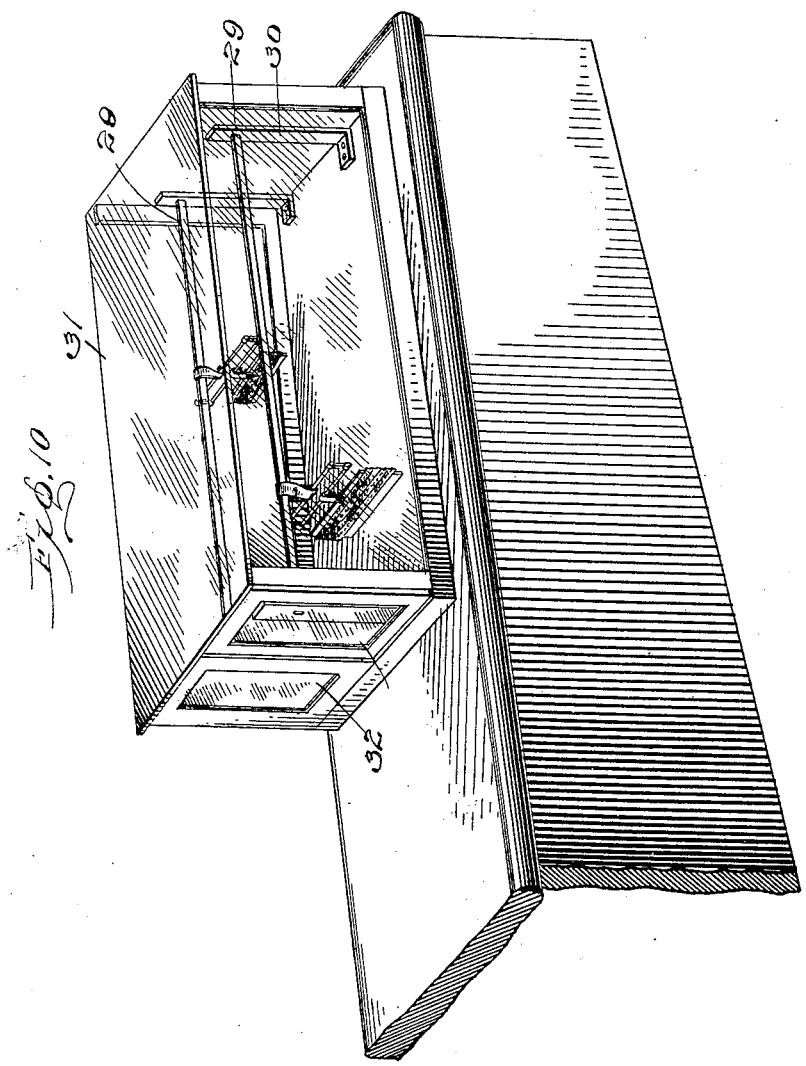

J. W. MOON.
DISPLAY RACK.
APPLICATION FILED AUG. 18, 1908.
925,011.
Patented June 15, 1909.
5 SHEETS—SHEET 5.
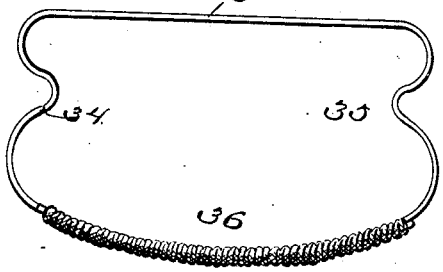
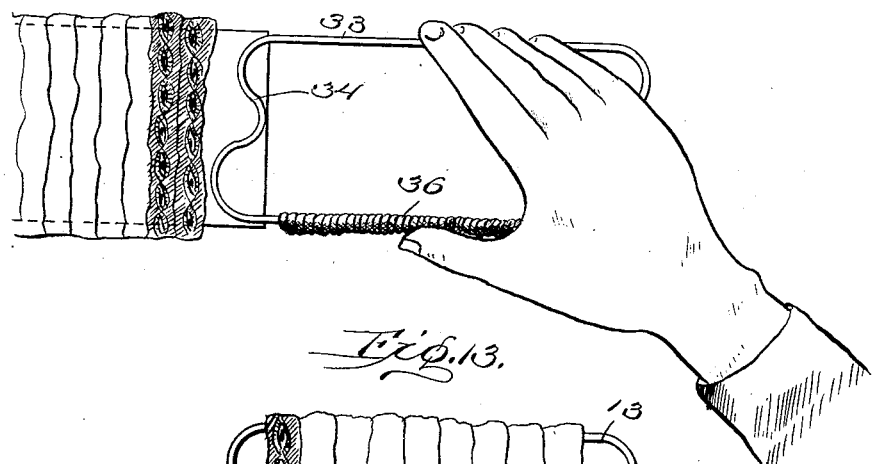
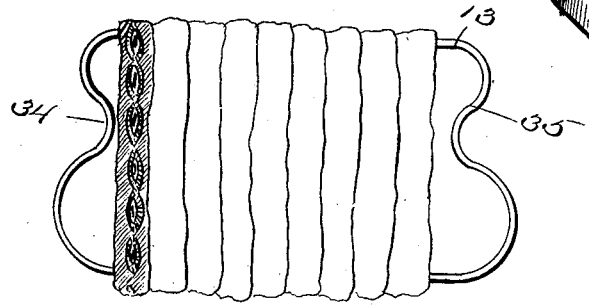
Witnesses
Inventor
John W. Moon
By Mason Fenwick Lawrence
his Attorneys

UNITED STATES PATENT OFFICE.

JOHN W. MOON, OF HIRAM, GEORGIA.

DISPLAY-RACK.

No. 925,011.     Specification of Letters Patent.     Patented June 15, 1909.

Application filed August 18, 1908. Serial No. 449,086.

*To all whom it may concern:*

Be it known that I, JOHN W. MOON, a citizen of the United States, residing at Hiram, in the county of Paulding and State of Georgia, have invented certain new and useful Improvements in Display-Racks; and I do hereby declare the following to be a full, clear, and exact description of the invention, such as will enable others skilled in the art to which it appertains to make and use the same.

This invention relates to improvements in racks, and particularly to display racks used in dispensing articles therefrom.

The object in view is the provision of a rack for receiving cards containing various matters to be displayed and dispensed, and to so arrange the rack that the various matter contained therein may be displayed without handling the same.

Another object of the invention is the provision of a rack that is formed with a rotating support for bringing various articles supported thereby into view successively.

Another object of the invention is the provision of a rack that is adapted to support various articles, and formed with means for adjusting the supporting members for accommodating various sized articles.

A further object of the invention is the provision of a rotating rack formed with a plurality of supporting members and a plurality of card holding members connected with said supporting members, the cards being adapted to be supplied with various matters, as lace, insertion, edging, and the like.

A further object in view is the provision of means for removing lace and the like from one card and placing the same upon another card.

A still further object of the invention is the provision of means for removing lace from one card to another and at the same time measuring the same.

With these and other objects in view, the invention comprises certain novel constructions, combinations, and arrangement of parts as will be hereinafter more fully described and claimed.

In the accompanying drawing: Figure 1 is a perspective view of a rack embodying the features of the present invention. Fig. 2 is a top plan view of the structure shown in Fig. 1. Fig. 3 is a side elevation of one of the supporting members used in supporting a lace carrying card. Fig. 4 is an edge view of Fig. 3, the card being removed. Fig. 5 is a detailed view partly in section of the catch for holding in position the various supporting members. Fig. 6 is a top plan view of a slightly modified form of rack and casing, certain parts being broken away to better disclose the construction of the rack. Fig. 7 is an enlarged side view of a card supporting member shown in connection with a fragmentary view of a supporting ring. Fig. 8 is a front view of a display tag showing a piece of insertion as being displayed thereon. Fig. 9 is a section through Fig. 8 on line 9—9. Fig. 10 is a perspective view of a case and rack embodying a slightly modified form of rack. Fig. 11 is a view of a holder used in moving lace from one card to another. Fig. 12 is a view showing how the holder disclosed in Fig. 11 is adapted to receive the lace from a card preparatory to placing the same upon another card. Fig. 13 is a view of a holder similar to the holder shown in Fig. 11 with the lace positioned thereon.

Referring to the drawing by numerals, 1 indicates a base, and 2 a supporting bar journaled in the base 1. The supporting bar 2 is formed with a plurality of notches 3 for supporting any desired number of supporting rings as 4. The rings 4 are provided with spokes 5 and hubs 6. The hubs 6 are formed with a square bore through which the rod 2 is adapted to pass. The bore in the hub 6 is formed square and the rod 2 is formed square so that whenever the rings 4 are given a rotary motion rod 2 will rotate. It will be evident that if desired bar 2 may be of some other shape and any desired means used for causing hub 6 to move with bar 2. Positioned in hub 6 which is adapted to reciprocate freely upon bar 2 is a catch 7 that usually prevents such reciprocation which in turn is normally held in contact with one of the notches 3 by a spring 8. By this means the hub 6 may be positioned at any desired height and catch 7 will engage one of the notches 3 and hold the same in the desired position, and consequently hold the various articles supported thereby in that position.

Mounted upon the rings 4 are any desired number of clamping members 9 that may be held in place by any desired means, as for instance bolts 10. The members 9 are bent over rings 4 and receive bolts 10 below the lower edge of the ring so that when the bolt is tightened a clamping action is secured, but if desired to move member 9 to any desired position upon ring 4 a bolt may be loosened and clamping member 9 moved around to the position desired and the bolts again tightened. The clamping member 9 is formed with a comparatively broad socket 11 through which is adapted to pass a rod 12. Rod 12 has connected therewith a rod 13 by connecting members 14 and 15. These rods and connecting members form what might be termed a sliding support for a card 16 that is adapted to carry lace, insertion, edging and the like. A clamp 17 that is formed with a hook portion for engaging rod 13 is provided. The clamp 17 is clamped to the card 16 substantially centrally thereof so as to evenly balance the card, but the hooked over portion of the clamp may rest upon any part of rod 13, and card 16 may remain in its correct position.

Secured to the card 16 is a tag 18 (see Figs. 7 and 8) which is designed to hold a card 19 of any desired color to emphasize and clearly display the good qualities of the lace or insertion 20 that is adapted to be placed thereon. If desired the price card may also be placed in tag 18 as well as a card for more advantageously displaying or showing off the particular qualities of lace. Tag 18 is formed with bent over portions 21 and 22 which form ways into which is forced card 19. The end of the lace from card 16 is then placed on card 19 and retaining members or arms 23 are permitted to bear against the same for preventing accidental removal thereof. Arms 23 are secured to a spring 24 which normally forces arms 23 against the lace or card as the case may be. The upper end of tag 18 is bent over at right angles to the main body portion and then has the sides of the bent over portion pressed together for forming a clamping member 25. Usually the tag 18 is notched out at the point at which the same is bent over for forming clamping member 25, the notches usually extending from each side to near the center. The tag 18 and the clamp 25 are made preferably from metal that is of springy consistency, so that when the sides of clamp 25 are pressed together they will form a clamp with a springy tendency so as to normally grip the cards 16 for holding the tag in position. The cards 16 are usually made from some strong cardboard and are easily grasped by clamp 17 as well as clamp 25.

The rack shown in Fig. 1 may be used simply as an open rack without any surroundings, but if desired I may place the same in a housing of any desired shape, as for instance round, square or hexagon shape, and either made from glass or simply curtained off for protecting the lace or other matter supported by the rack. When a housing is provided for the rack preferably the same is made from glass so as to display the various goods without having to open the housing. This is easily done as part of each card 16 is presented to view.

As clearly seen in Fig. 2 the rods 12 and 13 do not move directly in toward the supporting bar 2 but at an angle or tangent thereto. Any desired number of bars 12 and 13 may be provided and any desired sized rings 4 may be provided. By the positioning of the bars 12 and 13 at a tangent the end of each of the cards 16 supported thereby may be arranged so as to expose part of the lace contained thereon and yet not project beyond ring 4.

When it is desired to make a sale one of the members 14 may be grasped and rods 12 and 13 pulled outward for displaying to view the cards 16. If a sale is made the lace is removed by simply removing the hook off bar 13 and the desired amount of lace removed from the card and the card again replaced and bars 12 and 13 forced into the rack to substantially the position shown in Fig. 2.

In Fig. 6 will be seen a slightly modified form of display rack which is provided with a housing 26 of any desired structure. The housing has a plurality of glass doors 27 and 28 so as to freely display the various laces positioned therein. A supporting bar 2' and ring 4' are provided similar to the preferred construction, and also the cards as 16 of the preferred construction and their respective supports. The clamping supports 9' are similar to clamping members 9 except that the socket 11' is not twisted on a tangent or angle but arranged so that the cards 16 and bars 12 may move toward and from upright 2'. By this construction and arrangement a large number of cards may be positioned in any given rack and yet present many advantages. A device will also be presented that will permit the displaying of the various laces without handling the same.

Fig. 10 discloses a slightly different construction of supporting rack having a supporting bar 29 that has braces 30 for firmly supporting bar 29. Clamped to bar 29 are any desired number of clamping members 9 adapted to carry bars 12 and 13 and cards 16 as shown in the preferred construction. Any desired number may be placed upon the supporting bar 29 and are clearly displayed to the surrounding show case 31. The show case 31 is provided with a pair of sliding bars 32 that permit a ready entrance into the case for removing any of the laces desired.

In handling laces the finer quality is usually packed in very thin cardboard or tissue paper, and in order to display the same upon proper cards in the rack formed according to the present invention, the laces must be transferred from the thin flexible cardboard or from the tissue paper to a strong cardboard. In this transfer it is necessary to effect the same without soiling and if possible without touching the same with the hands. In transferring all kinds of laces, and particularly finer laces, I have provided a holder 33 made from springy material, and having its ends bent in at 34 and 35 and one side rounded. The frame is preferably made from spring wire and the rounded side is preferably the side at which the ends of the wire overlaps or joins. At the point of joining and preferably for the full length of the curved side is provided a wrapping 36 so as to present a smooth and yielding surface to the lace.

In operation the holder 33 is compressed as shown in Fig. 12 and inserted between the lace and the card or tissue paper, as the case may be, and after the frame has been inserted until the ends thereof project beyond the lace the same is permitted to expand slowly. The card or tissue paper is then removed, and the laces will appear upon the holder as shown in Fig. 12. A stiff card then may be inserted in between the holder and the lace and the holder compressed and removed.

What I claim is:

1. In a device of the character described, a base, a shaft connected with said base, a support secured to said shaft, and a twisted clasp connected with said support for supporting lace on said support, whereby the lace is arranged to extend at a tangent from a radial line to said shaft.

2. A device of the character described comprising a base, a support extending therefrom, rings supported by said support, clasps secured to said rings formed with eyelets extending at a tangent, and lace supporting bars slidably mounted in said eyelets.

3. In a device of the character described, a base, a support, a ring secured to said support, a clasp secured to said ring, said clasp being formed with an eyelet extending at a tangent from the support to the ring, a slidable bar mounted in said eyelet, a second bar secured to said first mentioned bar and spaced therefrom, and means for supporting a card on said second bar.

4. In a device of the character described, a base, a support, a ring adjustably secured to said support, a twisted clasp adjustably secured to said ring and formed with an eyelet, the twist in said clasp causing said eyelet to extend at a tangent to a radial line extending from said support, a slidable bar mounted in said eyelet, and means for supporting a card secured to said bar.

5. In a device of the character described, a base, a support, a ring secured to said support, a clasp secured to said ring formed with an eyelet, a slidable bar mounted in said eyelet, a second bar rigidly secured to said first mentioned bar and movable therewith, and adjustable means for supporting a card on said second mentioned bar.

6. In a device of the character described, a base, a supporting shaft, a ring, means for connecting said ring with said shaft, a clasp formed with an eyelet slidably mounted on said ring, a bar slidably mounted in said eyelet, a bar spaced from said first mentioned bar and rigidly connected therewith, and a clasp mounted on said second mentioned bar for holding an article to be displayed.

7. In a device of the character described, a support, a shaft secured to said support, a ring adjustably secured to said shaft, an adjustable arm secured to said ring at a tangent to a radial line therefrom, and means for supporting lace on said arm, whereby the lace will be arranged at a tangent to a radial line from said shaft.

In testimony whereof I affix my signature in presence of two witnesses.

JOHN W. MOON.

Witnesses:
JOHN W. ROPER,
W. H. TURNER.